United States Patent [19]

Klobucar et al.

[11] Patent Number: 5,567,229
[45] Date of Patent: Oct. 22, 1996

[54] ROTARY ADSORPTION UNIT WITH REGENERATIVE THERMAL OXIDIZER

[75] Inventors: Joseph M. Klobucar, Plymouth; Dinesh Bhushan, Ann Arbor, both of Mich.

[73] Assignee: Durr Industries, Inc., Plymouth, Mich.

[21] Appl. No.: 330,191

[22] Filed: Oct. 27, 1994

[51] Int. Cl.$^6$ .................................................. B01D 53/04
[52] U.S. Cl. ............................... 95/113; 95/141; 95/148; 96/125; 96/144; 502/34
[58] Field of Search .................................. 110/302, 304; 502/514; 95/113, 141, 148; 96/125, 144

[56] References Cited

U.S. PATENT DOCUMENTS

| | | | |
|---|---|---|---|
| 2,639,000 | 5/1953 | Edwards | 183/4.6 |
| 3,504,483 | 4/1970 | Tamura et al. | 55/180 |
| 3,883,326 | 5/1975 | Wenner | 55/34 |
| 4,190,423 | 2/1980 | Winter | 55/20 |
| 4,391,616 | 8/1983 | Imamura | 55/35 |
| 4,701,189 | 10/1987 | Oliker | 55/34 |
| 4,895,580 | 1/1990 | Morioka et al. | 55/160 |
| 4,930,294 | 6/1990 | Meier | 55/180 |
| 4,966,611 | 10/1990 | Schumacher et al. | 55/270 |
| 5,057,128 | 10/1991 | Panzica et al. | 55/181 |
| 5,080,700 | 1/1992 | Bergloff et al. | 55/181 |
| 5,167,679 | 12/1992 | Maekawa et al. | 55/208 |
| 5,169,414 | 12/1992 | Panzica et al. | 55/60 |
| 5,293,827 | 3/1994 | Nester et al. | 110/304 |

FOREIGN PATENT DOCUMENTS 0222102  9/1989  Japan.

*Primary Examiner*—Glenn A. Caldarola
*Attorney, Agent, or Firm*—Howard & Howard

[57] ABSTRACT

A rotary adsorption unit is disclosed wherein the desorb air is supplied by a regenerative thermal oxidizer. The system utilizes a closed desorb loop, with the desorb air being continuously cleaned at the regenerative thermal oxidizer and returned to the rotary adsorption unit. Fresh air is added into the desorb gas on the way to the regenerative thermal oxidizer, and an equal amount of air is bled off to maintain a constant air flow. The added air replaces oxygen that may be lost during cleaning of the desorb air.

6 Claims, 2 Drawing Sheets

ROTARY ADSORPTION UNIT WITH REGENERATIVE THERMAL OXIDIZER

BACKGROUND OF THE INVENTION

This application in general relates to a rotary adsorption unit for removing impurities from a gas flow, wherein the desorb function is performed by a closed loop air flow.

Rotary adsorption units, or rotary concentrators, are utilized to remove impurities from an air flow. It is typical that the rotary adsorption unit will include a number of blocks formed of a material that removes impurities from the air flow. The air to be cleaned is passed over the adsorption blocks. The adsorption unit continually rotates and the air to be cleaned is passed onto the adsorption unit over the majority of its rotary path of travel. A desorb or cleaning air flow is passed over the adsorption unit over a relatively small portion of the rotary path of travel of the unit. The desorb air is typically at a much higher temperature than the air to be cleaned, and removes the impurities from the block material.

The desorb air concentrates the impurities removed from the greater volumes of air flow that are cleaned by the adsorption unit. Flow ratios of air to be cleaned to desorb air are typically on the order of 5:1 to 15:1.

The prior art desorb air has been sent to a treatment unit, which removes the impurities from the desorb air. In one standard treatment unit, the desorb air is heated to burn the impurities. That heated clean air is then directed to a heat exchanger, which heats the desorb air then passing to the rotary adsorption unit. With such systems, complicated connections and control are necessary. Moreover, with the prior art systems the cleaned air, after completing its desorb function, is typically passed back to atmosphere. It is desirable to minimize the amount of air exposed to any such process that is passed back to the atmosphere, as there is always the possibility of escape of impurities or pollutants to the atmosphere. Moreover, the prior art systems which utilize heat transfer between the previous desorb air and the desorb air leading to the rotary adsorption unit is a relatively inefficient system. A good deal of heat energy may not be fully utilized in these systems, and is lost.

SUMMARY OF THE INVENTION

In one embodiment of this invention, the cleaning of the desorb air is achieved with a closed loop system. The air being sent to the rotary adsorption unit for desorption of the blocks, or removing impurities, passes into a treatment unit in which the impurities are combusted out of the desorb air. That air is then returned to the rotary adsorption unit, for subsequent desorption of the blocks. In such a closed system, not only is there minimal transfer of the desorb air to atmosphere, but the heat generated by cleaning the desorb air is utilized more efficiently.

In one embodiment of this invention, the treatment unit is a regenerative thermal oxidizer (RTO). One specific RTO embodiment includes two spaced heat exchangers positioned on opposed sides of a central combustion chamber. Air is typically moving into the combustion chamber for cleaning through one of the heat exchanges, while air from the combustion chamber is passing through the other of the heat exchangers. After a pre-determined period of time, the flow of air is switched between the two heat exchangers. In this way, one of the heat exchangers is being heated by air leaving the combustion chamber. At the same time, the other of the heat exchangers, which was previously heated by the air leaving the combustion chamber, is now in an inlet mode where it heats the air passing into the combustion chamber. Air leaving the regenerative thermal oxidizer is returned to the rotary adsorption unit for further de-adsorption of the unit. In this way, heat is efficiently utilized, and relatively large volumes of air may be cleaned by the combined rotary adsorption unit and the regenerative thermal oxidizer.

In other features of this invention, a small percentage of fresh air flow may be added into the desorb gas leaving the rotary adsorption unit and passing to the regenerative thermal oxidizer. The added air provides additional oxygen to replace oxygen lost through the repeated combustion of the impurities in the desorb air. At the same time, an equal volume of gas is preferably tapped off of the cleaned air passing from the oxidizer and back as desorb air. Preferably, the air is tapped off to achieve constant gas flow volumes. It is preferred that air is removed at a position between the regenerative thermal oxidizer on the passage leading back to the rotary adsorption unit. In one preferred embodiment of this invention, 10–50% of the gas flow is being constantly replaced in this way. The exact amount will be selected in response to the amount of solvent being removed to process air.

These and other features of the present invention can be best understood from the following specification and drawings, of which the following is a brief description.

DETAILED DESCRIPTION OF A PREFERRED EMBODIMENT

Figure 1:
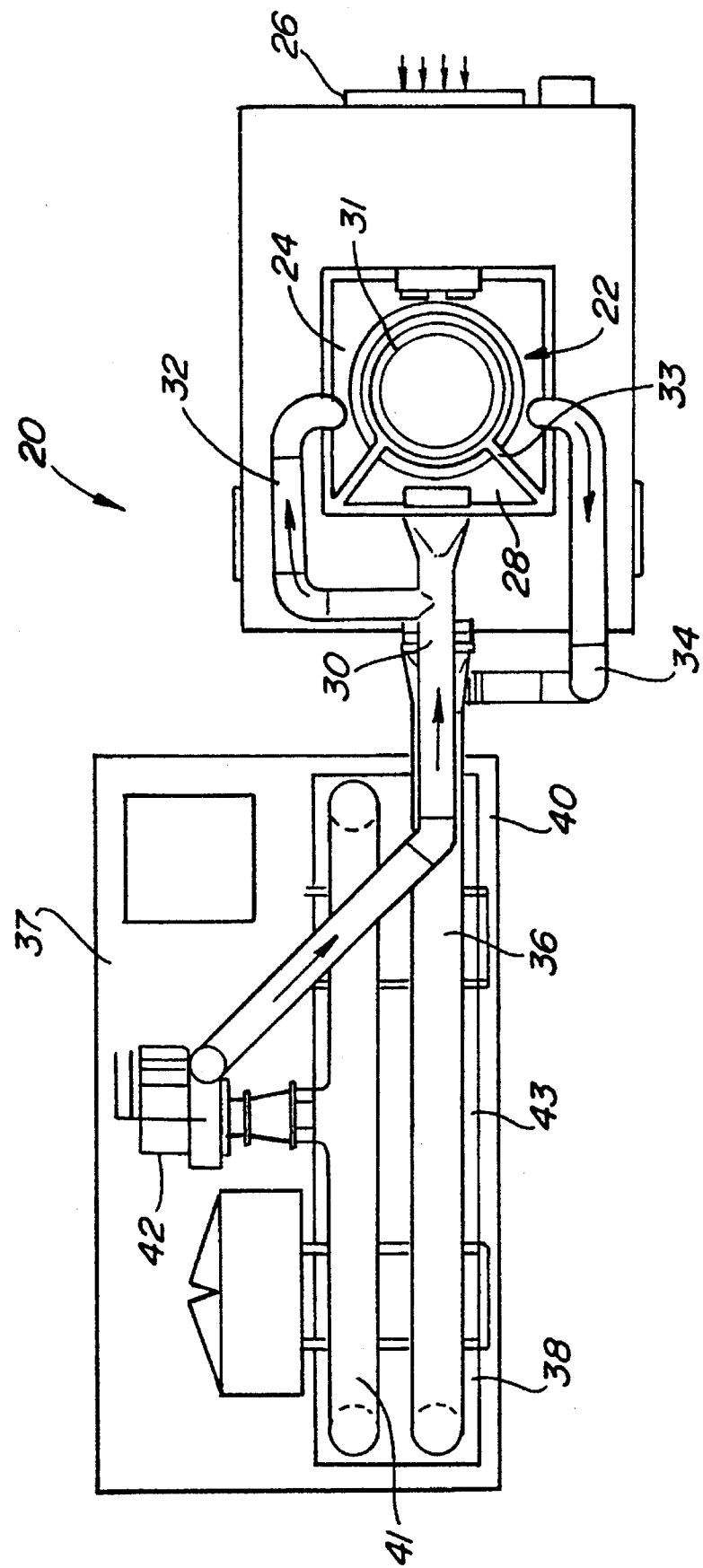
FIG. 1 is a somewhat schematic overview of a combined rotary adsorption unit and regenerative thermal oxidizer.

As shown in FIG. 1, a system 20 incorporates a rotary adsorption unit 22 having air cleaning section 24 for removing impurities from a process air flow moving into the unit 22 through an inlet 26. The detail and structure of the rotary adsorption unit 22 are as known in the art, and form no portion of this invention. Thus, unit 22 is shown somewhat schematically. As is known, the cleaning section 24 of the rotary adsorption unit 22 extends for the bulk of the circumferential extent of the rotating adsorption unit. A desorb air flow section 28 extends for a relatively small portion of the circumferential extent of the rotation of the rotary adsorption unit 22. A wall 33 is shown schematically separating sections 24 and 28. In application, the separation is achieved by complex sealing structures. A desorb air inlet 30 passes through the rotary adsorption unit over the relatively small desorb section 28 removing the concentrated impurities from the unit left by the previously cleaned gas at the cleaning section 24. The blocks that make up the rotating portion 31 continuously rotate through the cleaning section 24 into the desorb section 28.

The inventive system includes a clean gas bleed-off 32 from the desorb inlet 30 at a location prior to the gas being directed into the rotary adsorption unit. The bleed-off is sent to cleaning section 24, where it is treated with the process air. Further, air from a cooling gas line 34 may also be added into the outlet 36 leading from the desorb section 28. The cooling gas function is as known in the prior art.

The desorb gas passing into the rotary adsorption unit through inlet 30, and into the desorb section 28, passes over the adsorption blocks and removes impurities. The desorb gas, now carrying concentrated impurities, passes into the outlet passage 36.

The main features of this invention relate to gas treatment between outlet passage 36 and inlet passage 30. A regenerative thermal oxidizer 37 is connected between passages 30 and 36. In the illustrated embodiment, regenerative thermal oxidizer 37 includes two spaced heat exchangers 38 and 40. Other regenerative thermal oxidizer arrangements may be used. The inlet passage of the regenerative thermal oxidizer 37 communicates with outlet passage 36 carrying the dirty desorb air from the rotary adsorption unit 22. The outlet passage 41 of the regenerative thermal oxidizer system 37 leads to a fan 42 and to passage 30 bringing the cleaned air from the regenerative thermal oxidizer 36 back to the rotary adsorption unit 22.

As the rotary adsorption unit 22 operates, unit 31 rotates. Dirty air to be cleaned is brought through inlet 26, and into the cleaning section 24. The dirty air passes over the adsorption members in the rotary adsorption unit. Impurities in the dirty air are removed by the adsorption members. A clean desorb air is directed through inlet passage 30 over a relatively small circumferential desorb section 28 and onto the adsorption members. The desorb air removes the concentrated impurities from the adsorption members. The air leaving desorb section 28 passes into outlet passage 36 and is returned to the regenerative thermal oxidizer 37 for cleaning. The closed loop insures that the desorb air is not passed to atmosphere, and minimizes the risk of solvent escape. In addition, the heat energy from the cleaned desorb air is not lost to the atmosphere. Rather, that heat energy is utilized efficiently in pre-heating the air leading back to the desorb section.

Figure 2:
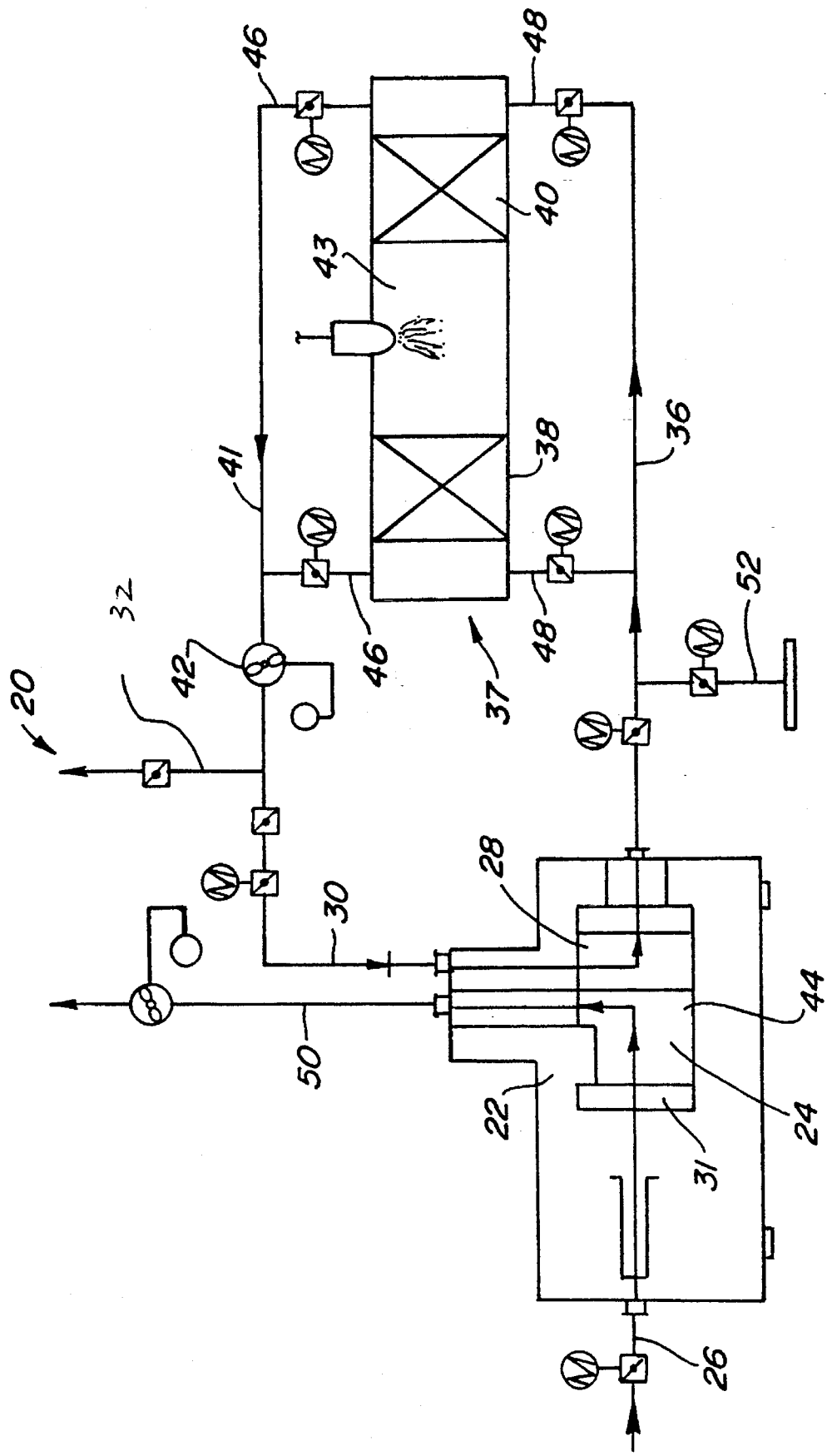
FIG. 2 is a flow schematic for the system illustrated in FIG. 1.

As shown in FIG. 2, valved outlet passages 46 lead from the heat exchangers 38 and 40, into passage 41, and from passage 41 through fan 42 and into the desorb inlet 30. That air then passes through the desorb section 28 of the rotary adsorption unit 24.

Similarly, valved inlet passages 48 connect the outlet passage 36 which carries the dirty desorb air through the heat exchangers 38 and 40 and into the combustion chamber 43. As is known in the art of regenerative thermal oxidizer systems, the heat exchangers 38 and 40 are cyclically switched between being in an "inlet" mode wherein they receive dirty air to be cleaned from outlet passage 36, and pass the air through the heat exchanger and into the combustion chamber 43. At the same time, and continuously, clean air from the combustion chamber which has been heated such that all the impurities have been combusted, passes through the other heat exchanger, through line 46 and into passage 41. That air is then returned to be used as desorb air at the rotary adsorption unit 24.

Since the desorb air is provided by a closed system, no air is directed outwardly into the atmosphere. Thus, all heat generated by the regenerative thermal oxidizer is efficiently utilized for preheating the desorb air. No heat energy is wasted. Further, since a closed system is utilized, the desorb air is not directed into the environment, where it has the potential to result in inadvertent leakage of impurities to the atmosphere. The cleaned, processed air from inlet 26 passes into the outlet passage 50 of the rotary adsorption unit and may be directed back into the atmosphere.

Passage 52 adds a percentage of fresh air to the dirty desorb air in passage 36 being returned to the regenerative thermal oxidizer 37 for cleaning. The same percentage of air is tapped from passage 41 through line 32. That air in line 32 may be returned to the process gas inlet 26 for cleaning. Passage 52 provides make-up oxygen to replace oxygen which may be consumed in the cleaning processes. It is preferred that approximately 10–50% of the total gas flow is being replaced continuously. The percentage is selected based on the solvent content of the dirty process air. Valves are shown on passages 52 and 32, and appropriate controls for air flow volumes would also be included.

Although a preferred embodiment of this invention has been disclosed, a worker of ordinary skill in the art would recognize that certain modifications would come within the scope of this invention. For that reason, the following claims should be studied to determine the true scope and content of this invention.

We claim:

1. A method of cleaning a gas flow comprising the steps of:

(1) providing a rotary adsorption unit, and rotating said rotary adsorption unit;

(2) passing a gas to be cleansed over the majority of the circumferential extent of said rotary adsorption unit, said rotary adsorption unit removing impurities from said gas to be cleaned;

(3) passing a desorb gas, from a regenerative thermal oxidizer as recited in step (4), and over said rotary adsorption unit over a portion of its circumferential extent, said desorb gas removing said impurities from said rotary adsorption unit as step (2) is occurring;

(4) directing said desorb gas from said rotary adsorption unit with entrained impurities to a regenerative thermal oxidizer, passing said desorb gas from said rotary adsorption unit through a first heat exchanger on said regenerative thermal oxidizer, and into a combustion chamber, combusting impurities within said desorb gas from said rotary adsorption unit, passing that combusted gas from said combustion chamber and into a second heat exchanger, said gas passing through said second exchanger then being returned as desorb gas in step (3), above, then (5) switching said desorb gas flow from the rotary adsorption unit into said second heat exchanger, into said combustion chamber, and then into said first heat exchanger, and then sending said desorbed gas flow back to said rotary adsorption unit as the desorb gas of step (3); and (6) cyclically repeating steps (4) and (5).

2. A method as recited in claim 1 wherein said desorb gas is air.

3. A method as recited in claim 2, further including the steps of adding fresh air to said desorb air, and bleeding off a portion of said desorb air.

4. A method as recited in claim 3, wherein said added fresh air is added to said desorb air leading from said rotary adsorption unit and to said regenerative thermal oxidizer.

5. A method as recited in claim 4, wherein said air being bled off is bled off on the desorb gas flow leading from said regenerative thermal oxidizer back to said rotary adsorption unit.

6. A method as recited in claim 5, wherein the volume of air added to said desorb gas is equal to 10–50% of said desorb air volume, and the amount of air bled off is approximately equal to the amount of air added to said desorb gas.

* * * * *